Patented Apr. 9, 1935

1,997,160

UNITED STATES PATENT OFFICE 1,997,160

HALOGENATED DYESTUFFS OF THE INDIGO SERIES

Heinrich Ulrich and Karl Saurwein, Ludwigshafen-on-the-Rhine, Germany, assignors to General Aniline Works, Inc., New York, N. Y., a corporation of Delaware No Drawing. Application October 11, 1932, Serial No. 637,354. In Germany October 20, 1931

11 Claims. (Cl. 260—52)

The present invention relates to a process of producing valuable halogenated dyestuffs of the indigo group.

We have found that halogenation products of dyestuffs of the indigo group can be produced in a very advantageous manner by treating dyestuffs of the indigo group with halogenating agents in the presence of alkyl or cycloalkyl sulphuric acids as diluents.

Suitable diluents which act as solvents or dispersing agents are for example methyl, ethyl, propyl, butyl, amyl and cyclohexyl sulphuric acids.

Suitable initial materials are for example indigo, its derivatives such as indigos containing already halogen, methyl indigo, tolyl indigo and other indigoids such as thioindigo. The halogenation, by which term preferably chlorination and bromation is meant, is effected either with free chlorine or bromine or with agents supplying these halogens, for example sulphuryl chloride or hydrobromic acid together with oxidizing agents such as chlorine or sodium nitrite.

The halogenation is effected at temperatures between 10° below zero and 80° C. The treatment with halogen may be carried out under ordinary or elevated pressure. In the latter case the reaction proceeds more rapidly than under ordinary pressure. If elevated pressure is employed the pressures will usually range up to 10 atmospheres. The reaction may be carried out in the presence of catalysts such as iodine or sulphur chloride.

The alkyl and cycloalkyl sulphuric acids have a greater solvent power for indigo and its derivatives than sulphuric acid itself and their employment is not attended by objections occurring when using sulphuric acid, as the latter forms difficultly soluble sulphates with indigo and its derivatives and has also an undesirable sulphonating or oxidizing action at the same time. For example indigo forms a difficultly soluble sulphate with concentrated sulphuric acid and it is therefore necessary to use an amount of sulphuric acid which is from about 8 to 10 times the amount of indigo in order to obtain the latter in some degree in a form in which it may be halogenated. If, on the contrary, ethyl sulphuric acid be employed for example as the solvent, an amount thereof equal to about twice the amount of indigo is sufficient to effect complete dissolution. Moreover, indigo is very readily sulphonated by concentrated sulphuric acid as is well known. Indigo is not attacked by ethyl sulphuric acid, however; it may be allowed to stand for days in solution in ethyl sulphuric acid at room or elevated temperature without any sulphonation taking place. Furthermore, while indigo when halogenated in solution in sulphuric acid readily undergoes attack by oxidation, it may be directly converted into chlorindigo in solution in ethyl sulphuric acid.

In addition, alkyl and cycloalkyl sulphuric acids have a much better solvent power for chlorine and bromine than concentrated sulphuric acid. The said acids are not attacked by halogen. When employing agents supplying halogen, as for example sulphuryl chloride or hydrobromic acid, instead of free halogen for the halogenation of indigo and its derivatives dissolved or dispersed in alkyl or cycloalkyl sulphuric acids, the reaction proceeds much more favorably than when working in free sulphuric acid by reason of the great solubility of the said substances in alkyl sulphuric acids. Technically it is of especial importance that when using alkyl or cycloalkyl sulphuric acids as solvents or dispersing agents it is possible in brominating indigo and its derivatives to use the whole of the bromine employed for substitution without loss. In the usual bromination processes about half of the bromine employed is lost in the form of hydrobromic acid. The alkyl and cycloalkyl sulphuric acids have such a good solvent power for hydrobromic acid that the hydrobromic acid in these solutions may be quantitatively oxidized to bromine again with an oxidizing agent, as for example chlorine.

After the halogenation is completed the reaction mixture is usually worked up by diluting with such an amount of water that the halogenated dyestuff is precipitated. The whole mass may then be heated whereby saponification of the alkyl or cycloalkyl sulphuric acid occurs and the alcohol formed thereby distills off. The alcohol may be converted again into alkyl sulphuric acid. The dyestuff formed may be filtered off before heating.

The following examples will further illustrate the nature of this invention but the invention is not restricted to these examples. The parts are by weight.

*Example 1*

600 parts of indigo are dissolved in 1200 parts of ethyl sulphuric acid at room temperature and chlorine is led into the solution while stirring, also at room temperature, until the formation of monochlorindigo is completed.

The reaction product is poured into water whereby the monochlorindigo formed in quantitative yield is precipitated. The dyestuff is filtered off by suction, washed and recovered as a paste. The reaction may also be carried out under elevated pressure under otherwise the same conditions.

Example 2

1000 parts of 4.4'-dichlorindigo are dissolved at room temperature in 3000 parts of methyl sulphuric acid and 1150 parts of bromine are allowed to run in slowly. The mixture is stirred for 6 hours at a temperature below 30° C., heated during a further 6 hours to 60° C. and then kept at this temperature until all the bromine has disappeared. The reaction mixture is poured into water, filtered by suction, washed and the product recovered as a paste containing 1410 parts of 4.4'-dichlor-5.5'-dibromindigo.

Example 3

262 parts of indigo are dissolved at room temperature in 500 parts of ethyl sulphuric acid and 165 parts of bromine are then allowed to flow in. The mixture is heated to 40° C. and is kept at this temperature for 5 hours. The whole is then cooled to 10° C. and 70 parts of chlorine are led in, whereby bromine is set free from the hydrobromic acid which has remained dissolved in the ethyl sulphuric acid. The temperature is raised again to 40° C. and kept constant at this temperature until all the bromine has disappeared. The working up is carried out as described in Example 3. 5.5'-dibromindigo is obtained in a good yield.

Example 4

262 parts of indigo are dissolved in 550 parts of normal amylsulphuric acid and 80 parts of chlorine are led into the solution at from 5° to 8° C. The solution is then poured into water, the deposited product filtered off by suction and washed first with dilute caustic soda and then with water. Instead of the normal amylsulphuric acid, 600 parts of the sulphuric ester of cyclohexanol may be employed with the same result. A good yield of dichlorindigo is obtained.

Example 5

20 parts of thioindigo in 60 parts of n-butyl sulphuric acid are treated with 6 parts of chlorine in the presence of 0.2 part of iodine at 10° to 15° C. The product is monochlorthioindigo.

Example 6

290 parts of 7.7'-dimethylindigo are mixed with 870 parts of cyclohexyl sulphuric acid and treated at 25° C. with 80 parts of chlorine. 7.7'-dimethyl-5-chlorindigo is obtained.

What we claim is:

1. The process of producing halogenation products of dyestuffs of the indigo group which comprises treating a dyestuff of the indigo group with a halogenating agent in the presence of a diluent selected from the group consisting of the alkyl and cycloalkyl sulphuric acids.

2. The process of producing halogenation products of dyestuffs of the indigo group which comprises treating a dyestuff of the indigo group with a halogenating agent in the presence of an alkyl sulphuric acid.

3. The process of producing halogenation products of dyestuffs of the indigo group which comprises treating a dyestuff of the indigo group with a halogenating agent in the presence of a diluent selected from the group consisting of the alkyl and cycloalkyl sulphuric acids at a temperature between 10° below zero and 80° C.

4. The process of producing halogenation products of dyestuffs of the indigo group which comprises treating a dyestuff of the indigo group with a halogenating agent in the presence of a diluent selected from the group consisting of the alkyl and cycloalkyl sulphuric acids at a temperature between 10° below zero and 80° C. under a pressure of up to 10 atmospheres.

5. The process of producing halogenated indigo which comprises treating indigo with a halogenating agent in the presence of a diluent selected from the group consisting of the alkyl and cycloalkyl sulphuric acids.

6. The process of producing monochlorindigo which comprises dissolving indigo in ethyl sulphuric acid and treating the solution obtained with chlorine until one atomic proportion of chlorine is fixed per each molecular proportion of indigo.

7. The process of producing monochlorindigo which comprises dissolving indigo in ethyl sulphuric acid and treating the solution obtained with chlorine at room temperature until one atomic proportion of chlorine is fixed per each molecular proportion of indigo.

8. The process of producing 5.5'-dibromindigo which comprises dissolving indigo in ethyl sulphuric acid, adding slightly more than two atomic proportions of bromine per each molecular proportion of indigo, warming the mixture, cooling, leading in about two atomic proportions of chlorine per each molecular proportion of indigo and warming until all the bromine has disappeared.

9. The process of producing 4.4'-dichlor-5.5'-dibromindigo which comprises dissolving 4.4'-dichlorindigo in methyl sulphuric acid, adding about 1.15 parts per 1 part of 4.4'-dichlorindigo and warming until all the bromine has disappeared.

10. The process of producing chlorination products of dyestuffs of the indigo group which comprises treating a dyestuff of the indigo group with chlorine in the presence of a diluent selected from the group consisting of the alkyl and cycloalkyl sulphuric acids.

11. The process of producing bromination products of dyestuffs of the indigo group which comprises treating a dyestuff of the indigo group with bromine in the presence of a diluent selected from the group consisting of the alkyl and cycloalkyl sulphuric acids.

HEINRICH ULRICH.
KARL SAURWEIN.